(12) United States Patent
King et al.

(10) Patent No.: US 11,944,260 B2
(45) Date of Patent: Apr. 2, 2024

(54) VACUUM CLEANER

(71) Applicant: Dyson Technology Limited, Wiltshire (GB)

(72) Inventors: Kristian Richard Thomas King, Bristol (GB); Nathan Lawson McLean, Bristol (GB); Andrew James Holden, Gloucester (GB); Edward James Baldry, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 17/292,271

(22) PCT Filed: Nov. 6, 2019

(86) PCT No.: PCT/GB2019/053139
§ 371 (c)(1),
(2) Date: May 7, 2021

(87) PCT Pub. No.: WO2020/099831
PCT Pub. Date: May 22, 2020

(65) Prior Publication Data
US 2021/0393097 A1 Dec. 23, 2021

(30) Foreign Application Priority Data
Nov. 9, 2018 (GB) ..................... 1818287

(51) Int. Cl.
*A47L 5/24* (2006.01)
*A47L 5/22* (2006.01)
(Continued)

(52) U.S. Cl.
CPC ............. *A47L 9/2857* (2013.01); *A47L 5/225* (2013.01); *A47L 5/24* (2013.01); *A47L 5/28* (2013.01);
(Continued)

(58) Field of Classification Search
CPC .. G09B 5/065; G09B 19/003; G09B 19/0053; G09B 5/00; G06F 3/14; A47L 9/2857;
(Continued)

(56) References Cited

U.S. PATENT DOCUMENTS 5,507,067 A * 4/1996 Hoekstra ............... A47L 9/2857
15/319
7,403,360 B2 7/2008 Cunningham
(Continued)

FOREIGN PATENT DOCUMENTS

CN 1201964 A 12/1998
CN 101143081 A 3/2008
(Continued)

OTHER PUBLICATIONS

International Search Report and Written Opinion dated Mar. 4, 2020, directed to International Application No. PCT/GB2019/053139; 9 pages.

(Continued)

*Primary Examiner* — Brian D Keller
*Assistant Examiner* — Caleb Andrew Holizna
(74) *Attorney, Agent, or Firm* — Tucker Ellis LLP; Michael G. Craig

(57) ABSTRACT

A vacuum cleaner including a vacuum motor configured to draw an air flow through an air flow path of the vacuum cleaner; a dirt separator having dirt, receptacle; a display screen; and a controller configured to control images displayed on the screen. The dirt receptacle has a closed configuration in which it can receive dirt separated from the air flow, and an open configuration in which dirt contained in the dirt receptacle can be emptied therefrom. The controller is configured to display video instructions on the screen.

14 Claims, 16 Drawing Sheets

(51) Int. Cl.
*A47L 5/28* (2006.01)
*A47L 9/16* (2006.01)
*A47L 9/24* (2006.01)
*A47L 9/28* (2006.01)
*G06F 3/14* (2006.01)
*G09B 5/06* (2006.01)
*G09B 19/00* (2006.01)

(52) U.S. Cl.
CPC ............ *A47L 9/1683* (2013.01); *A47L 9/248* (2013.01); *A47L 9/2836* (2013.01); *G09B 5/065* (2013.01); *G09B 19/003* (2013.01); *G06F 3/14* (2013.01)

(58) Field of Classification Search
CPC ...... A47L 9/1683; A47L 9/248; A47L 9/2836; A47L 5/225; A47L 5/24; A47L 5/28; A47L 9/2842; G11B 27/007; H04N 2201/3267
USPC .......................................................... 15/319
See application file for complete search history.

(56) References Cited

U.S. PATENT DOCUMENTS

| | | | |
|---|---|---|---|
| 7,461,430 B2 | 12/2008 | Reick-Mitrisin et al. | |
| 7,599,758 B2 | 10/2009 | Reindle et al. | |
| 8,438,693 B2 | 5/2013 | Fujiwara | |
| 8,483,881 B2 | 7/2013 | Ermakov et al. | |
| 8,683,645 B2 | 4/2014 | Glassman | |
| 9,215,960 B2 | 12/2015 | Conrad | |
| 9,364,127 B2 | 6/2016 | Conrad | |
| 2009/0271944 A1 | 11/2009 | Lovelass | |
| 2012/0032514 A1 | 2/2012 | Alberghetti et al. | |
| 2012/0079671 A1* | 4/2012 | Stickney | A47L 9/02 15/344 |
| 2012/0152280 A1 | 6/2012 | Bosses | |
| 2013/0340203 A1 | 12/2013 | Cunningham et al. | |
| 2014/0201628 A1 | 7/2014 | Guilleminot et al. | |
| 2015/0109637 A1* | 4/2015 | Ikeda | G11B 27/105 358/1.15 |
| 2015/0327838 A1* | 11/2015 | Francis | A61B 8/4433 600/459 |
| 2017/0196419 A1 | 7/2017 | Brown et al. | |
| 2017/0215664 A1 | 8/2017 | Conrad | |
| 2017/0282866 A1 | 10/2017 | Williams et al. | |
| 2018/0024732 A1 | 1/2018 | Kobayashi et al. | |
| 2018/0055312 A1 | 3/2018 | Jung | |
| 2018/0055326 A1 | 3/2018 | Jung | |
| 2018/0263439 A1* | 9/2018 | Dimbylow | A47L 9/16 |
| 2019/0260896 A1* | 8/2019 | Shiota | H04N 1/00779 |
| 2020/0005672 A1* | 1/2020 | Robinson | B08B 5/04 |

FOREIGN PATENT DOCUMENTS

| | | | |
|---|---|---|---|
| CN | 102264270 A | 11/2011 | |
| CN | 106859485 A | 6/2017 | |
| CN | 107928542 A | 4/2018 | |
| DE | 102011000816 A1 | 8/2012 | |
| DE | 102015100353 A1 | 7/2016 | |
| EP | 2186463 B1 | 1/2012 | |
| EP | 2700345 A2 | 2/2014 | |
| JP | 2006-141836 A | 6/2006 | |
| JP | 2006-198079 A | 8/2006 | |
| JP | 2006-247229 A | 9/2006 | |
| JP | 2009-122184 A | 6/2009 | |
| JP | 2015-039792 A | 3/2015 | |
| JP | 2015-090629 A | 5/2015 | |
| JP | 2017-169845 A | 9/2017 | |
| JP | 2017-185098 A | 10/2017 | |
| JP | 2018-011774 A | 1/2018 | |
| KR | 1999-0028401 U | 4/1999 | |
| KR | 10-2007-0043403 A | 4/2007 | |
| KR | 10-0937254 B1 | 1/2010 | |
| KR | 10-2011-0004015 A | 1/2011 | |
| KR | 10-1233158 B1 | 4/2011 | |
| KR | 10-1233157 B1 | 1/2012 | |
| KR | 10-1233159 B1 | 7/2012 | |
| KR | 10-2015-0019294 A | 2/2015 | |
| KR | 20110028290 A * | 3/2017 | ............ G06F 3/041 |
| WO | 2005/107559 A1 | 11/2005 | |
| WO | 2007/125003 A1 | 11/2007 | |
| WO | 2010/096217 A1 | 8/2010 | |
| WO | 2013/108665 A1 | 7/2013 | |
| WO | 2014/196272 A1 | 12/2014 | |
| WO | 2017/117679 A1 | 7/2017 | |
| WO | 2018/036126 A1 | 1/2018 | |

OTHER PUBLICATIONS

Search Report dated Apr. 25, 2019, directed to GB Application No. 1818287.3; 1 page.
Office Action received for Japanese Patent Application No. 2021-524432, dated Jul. 19, 2022, 7 pages (4 pages of English Translation and 3 pages of Original Document).
Office Action received for Korean Patent Application No. 10-2021-7016406, dated Aug. 19, 2022, 13 pages (7 pages of English Translation and 6 pages of Original Document).
Office Action received for Chinese Patent Application No. 201980073807.9, dated Nov. 10, 2021, 17 pages (9 pages of English Translation and 8 pages of Original Document).

* cited by examiner

VACUUM CLEANER

REFERENCE TO RELATED APPLICATIONS

This application is a national phase application under 35 USC 371 of International Application No. PCT/GB2019/053139, filed Nov. 6, 2019, which claims the priority of United Kingdom Application No. 1818287.3, filed Nov. 9, 2018, the entire contents of each of which are incorporated herein by reference.

FIELD OF THE DISCLOSURE

The present invention relates to a vacuum cleaner.

BACKGROUND OF THE DISCLOSURE

Modern vacuum cleaners are often relatively complex, as manufacturers have sought to provide additional or improved functionality. Accordingly, many vacuum cleaners now require users to perform relatively complicated procedures in order to use them properly. As a result, operation of many vacuum cleaners is no longer a matter of simple intuition. Users are therefore forced to read instruction manuals, or to work out how to operate their vacuum cleaner by trial and error. In the former case users can become frustrated by the amount of time spent reading, and in the latter case users can damage their machines or unwittingly use them in a way which does not provide optimum performance.

SUMMARY OF THE DISCLOSURE

It is one object of the present invention to mitigate or obviate at least one of the above disadvantages, and/or to provide an improved or alternative vacuum cleaner.

According to a first aspect of the present invention there is provided a vacuum cleaner comprising:
- a vacuum motor configured to draw an air flow through an air flow path of the vacuum cleaner;
- a dirt separator for separating dirt entrained in said air flow, the dirt separator having dirt receptacle;
- a display screen; and
- a controller configured to control images displayed on the screen, wherein:
- the dirt receptacle has a closed configuration in which it can receive dirt separated from the air flow, and an open configuration in which dirt contained in the dirt receptacle can be emptied therefrom; and
- the controller is configured to display video instructions on the screen.

The vacuum cleaner displaying video instructions can present the necessary information to the user directly, reducing or eliminating the need for them to consult a written or online instruction manual (or the temptation for the user to try and operate the vacuum cleaner without consulting any instructions at all). Further, video instructions can often be particularly easily understood, and/or can reduce the need for text-based instructions (which can be intimidating to some users, and which need translating if a vacuum cleaner is to be sold in several countries).

The video instructions may include video instructions for normal operation of the vacuum cleaner.

In other words, the screen may display one or move videos which show the user how to operate the vacuum cleaner when the vacuum cleaner is functioning correctly. Some users can be particularly prone to attempting to use a vacuum cleaner for the first time without reading instructions, potentially misunderstanding how the vacuum cleaner should be used, therefore the advantages discussed above may be particularly beneficial.

Said video instructions for normal operation may include instructions for moving the dirt receptacle from the closed configuration to the open configuration.

As well as the benefits discussed above, the user being shown how to empty the receptacle can serve as an indication that the receptacle is full, and/or may indicate that the receptacle is in a configuration between the open and closed configurations. Furthermore, opening a receptacle can be one of the less intuitive operations involved in using a vacuum cleaner, since the mechanism can be relatively complex, so the user being shown how to do this can be of particular benefit.

Said video instructions for normal operation may include instructions for moving the dirt receptacle from the open configuration to the closed configuration.

As with showing the user how to empty the receptacle, showing the user how to close the receptacle can serve as an indication that the receptacle is in a configuration between the open and closed configurations. Similarly, closing a receptacle can be one of the less intuitive operations involved in using a vacuum cleaner, so the user being shown how to do this can be of particular benefit.

Said video instructions for normal operation may include instructions for cleaning a filter assembly of the vacuum cleaner.

Some users are particularly prone to forgetting (or ignoring) the need to clean the filter assembly of the vacuum cleaner, therefore the video instructions can provide a particularly important reminder. Also, cleaning a filter may be one of the less intuitive operations needed when using a vacuum cleaner, so clear instruction in this regard can be particularly beneficial.

The video instructions may include video instructions for problem-solving.

In other words, the screen can display video instructions for locating and/or dealing with a fault condition of the vacuum cleaner.

The video instructions for problem-solving may include video instructions for locating a blockage in the air flow path.

A vacuum cleaner becoming blocked is a particularly common fault in vacuum cleaners, therefore video instructions to enable a user to locate and/or remove a blockage can be of particular benefit.

The video instructions may include video instructions for assembling and/or disassembling the vacuum cleaner.

For instance, the video instructions may include a video showing a user how to remove a filter from the vacuum cleaner so that it can be washed (at which point this video may be considered to be video instructions for normal operation of the vacuum cleaner). As another example, the video instructions may include a video showing a user how to remove a wand and cleaner head from a stick vacuum cleaner so as to locate a blockage (whereupon this video may be considered to be video instructions for problem-solving).

The controller may be configured to automatically display video instructions on the screen upon detecting that the vacuum cleaner is in an associated condition.

This can enable the display of video instructions to act as an alert to the user that an action should be taken, and/or can present the user with information without them having to perform an additional operation (for instance pressing a button) so as to access it.

The controller may be configured to selectively cut power to the vacuum cleaner upon detecting that the vacuum cleaner is in said condition.

This can further increase the ability of the display of video instructions to act as an alert. A user may not notice video instructions being displayed while the vacuum cleaner is in use, whereas if the vacuum motor stops unexpectedly then the user is likely to look to the screen for an explanation.

Said video instructions may include a set of instructions made up of several shorter sub-videos played consecutively.

This may be beneficial in that it can break down the video instructions for a particular task into more manageable pieces. For example if the screen were to display a video showing how remove a filter, clean it and then reinstall it, a user may struggle to follow all of this at once. The video being broken down into sub-videos may therefore make it easier for the user to follow along with it.

The vacuum cleaner may further comprise a user-actuable control member in communication with the controller, the controller being configured to advance from one sub-video to the next upon actuation of the control member.

The user being able to control when the screen shows the nest sub-video in sequence allows them to tailor the timing of the video instructions to suit them, confirming when they are ready to watch the next sub-video.

The controller may be configured to advance through the sub-videos automatically once a sub-condition is met.

Some users may find manually advancing through sub-videos irritating. It may therefore be beneficial for the controller to autonomously display sub-videos.

In some embodiments, the controller may be configured to advance through the sub-videos automatically but it may additionally be possible for the user to override this and advance from one video to the next by actuating a control member.

The controller may be configured to automatically instigate a pause between each of the sub-videos.

The use of a pause between sub-videos can ensure that a user has sufficient time to follow along with each sub-video before the next one starts.

The controller may be configured to automatically repeat each sub-video at least once.

As an example, where the controller advances through the sub-videos automatically the controller may display each sub video two, three or more times before automatically advancing to the next sub-video. As another example, where the controller advances through sub-videos upon actuation of a control member, the controller may repeat each sub-video on a loop until the control member is actuated.

Sub-videos being repeated can ensure that the user has the chance to re-watch a sub-video if they miss it, or discover that they have misunderstood it upon first viewing.

Said video instructions may include a visual timer, such as a countdown timer or progress bar, for indicating to the user how far through a particular video or sub-video they are. Instead or as well, said video instructions may include an image or animation to indicate that a video or sub-video has finished. For instance, a video or sub-video may finish with the display of a green tick, smiling face or chequered flag. This can avoid the risk of the user continuing to watch the screen at the end of a video, unsure of whether or not further instructions will be displayed.

The vacuum cleaner may be a handheld vacuum cleaner which further comprises a pistol grip which is positioned generally transverse to a longitudinal axis of the vacuum cleaner that runs from a front end to a rear end thereof, and an air inlet positioned forward of the pistol grip.

As an alternative, the vacuum cleaner may be a handheld vacuum cleaner of a different configuration, or another form of vacuum cleaner such as an upright or cylinder vacuum cleaner.

The screen may face generally rearwards. Commonly, to use such a vacuum cleaner the user holds it by the pistol grip and 'points' the longitudinal axis towards an area to be cleaned in a manner akin to pointing a pistol at a target, so as to direct the air inlet (or a suction tool attached thereto) to that area. The electronic visual display facing generally rearwards means that it more clearly visible to the user during use. In contrast, if the electronic visual display faced in a different direction, the user may have to discontinue use and reposition the vacuum cleaner so as to view the electronic visual display.

According to a second aspect of the present invention there is provided a stick vacuum cleaner comprising:
 a handheld vacuum cleaner according to the first aspect of the present invention;
 a cleaner head defining a suction opening; and
 an elongate rigid wand defining a suction path which extends from the cleaner head to the air inlet of the handheld vacuum cleaner, the wand being positioned substantially parallel to or collinear with the longitudinal axis.

The wand and cleaner head can allow a handheld vacuum cleaner, which can provide the advantages discussed above, to be used more effectively for floor cleaning.

BRIEF DESCRIPTION OF THE DRAWINGS

Embodiments of the present invention will now be described, by way of example only, with reference to the accompanying drawings in which.

DETAILED DESCRIPTION OF THE DRAWINGS

Figure 1:
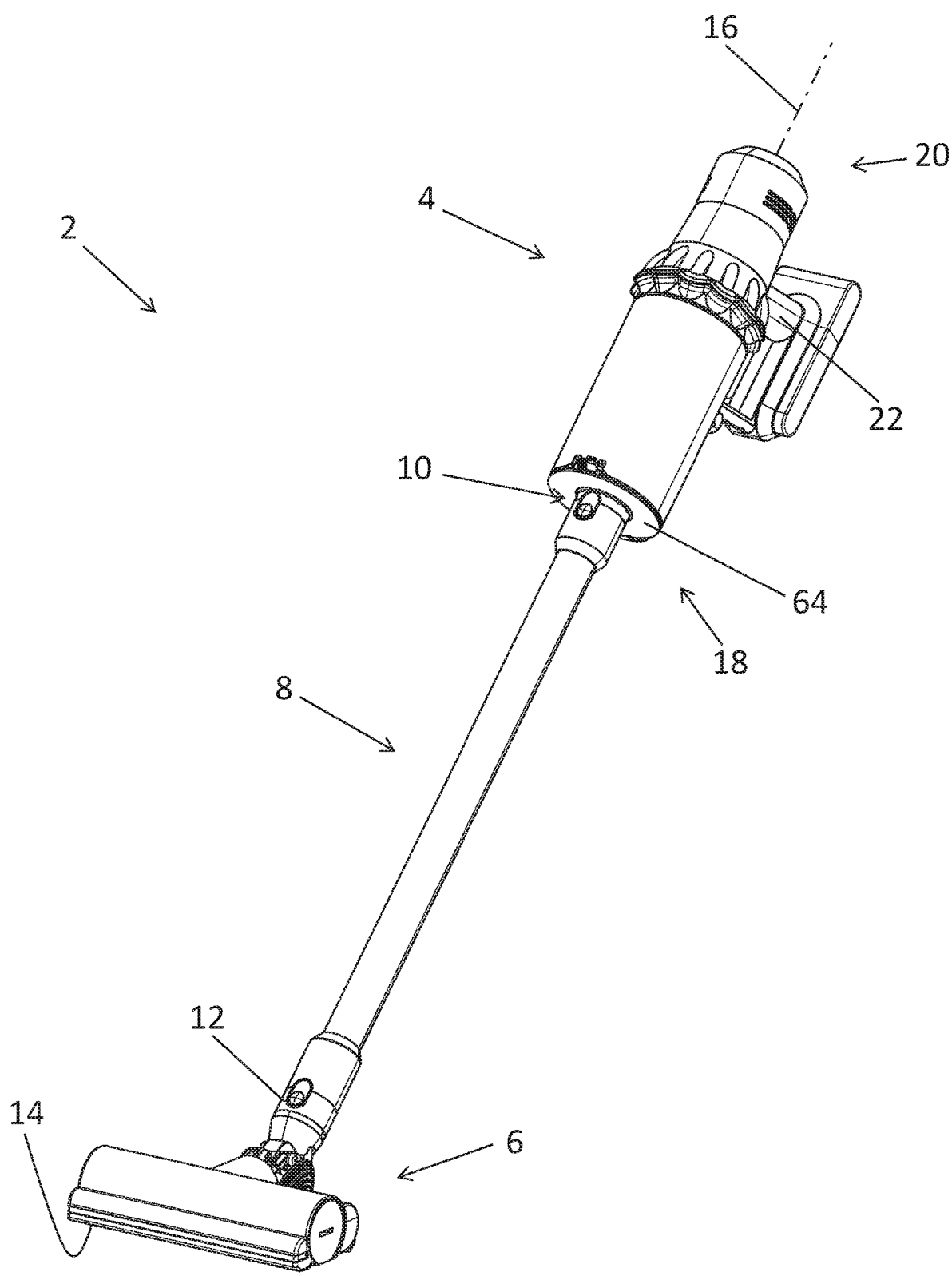
FIG. 1 is a perspective view of a stick vacuum cleaner according to an embodiment of the present invention.

Throughout the description and drawings, corresponding reference numerals denote corresponding features.

FIG. 1 shows a stick vacuum cleaner 2 according to an embodiment of the invention. The stick vacuum cleaner 2 comprises a handheld vacuum cleaner 4 which is connected to a floor tool 6 in the form of a cleaner head by an elongate rigid wand 8. In this case the wand is attachable to an air inlet 10 of the handheld vacuum cleaner, and to a rear duct 12 of the cleaner head 6. The wand 8 is generally tubular, the space inside forming a suction path which extends from the cleaner head 6 to the air inlet 10 of the handheld vacuum cleaner 4.

The cleaner head 6 has a sole plate 14 which is configured to engage a floor surface, and which has a suction opening (not visible) through which dirty air (i.e. air with entrained dirt) from the floor surface can be sucked into the cleaner head 6. In use, a vacuum motor (not visible) housed in the handheld vacuum cleaner 4 generates suction at the air inlet 10. Dirty air from a floor surface is drawn into the cleaner head 6 through the suction opening (not visible) in the sole plate 14, then runs along the inside of the wand 8 and into the air inlet 10 of the handheld vacuum cleaner.

The wand 8 is releasably attachable to the handheld vacuum cleaner 4, so that the handheld vacuum cleaner can be used on its own (or with a tool attached to the air inlet 10). The wand 8 is also releasably attachable to the cleaner head 6, so that different floor tools can be fitted to the wand. Furthermore, the rear duct 12 of the cleaner head 6 can be attached directly to the air inlet 10 of the handheld vacuum cleaner so that the cleaner head 6 can be used in conjunction with the handheld vacuum cleaner 4 rather than being limited to use as part of the stick vacuum cleaner 2.

The handheld vacuum cleaner 4 defines a longitudinal axis 16 which runs from a front end 18 of the handheld vacuum cleaner to a rear end 20. The longitudinal axis 16 intersects the air inlet 10. When it is attached to the handheld vacuum cleaner 4, the wand 8 is parallel to (and in this case collinear with) the longitudinal axis 16. The handheld vacuum cleaner further comprises a pistol grip 22 which is positioned transverse to the longitudinal axis 16. The pistol grip 22 is positioned rearward of the air inlet 10, i.e. the axial position of the pistol grip is further towards the rear end 20 than the air inlet. In other words, the air inlet 10 is positioned forward of the pistol grip 22 (in that the axial position of the air inlet is further towards the front end 18 than the pistol grip).

Figure 2:
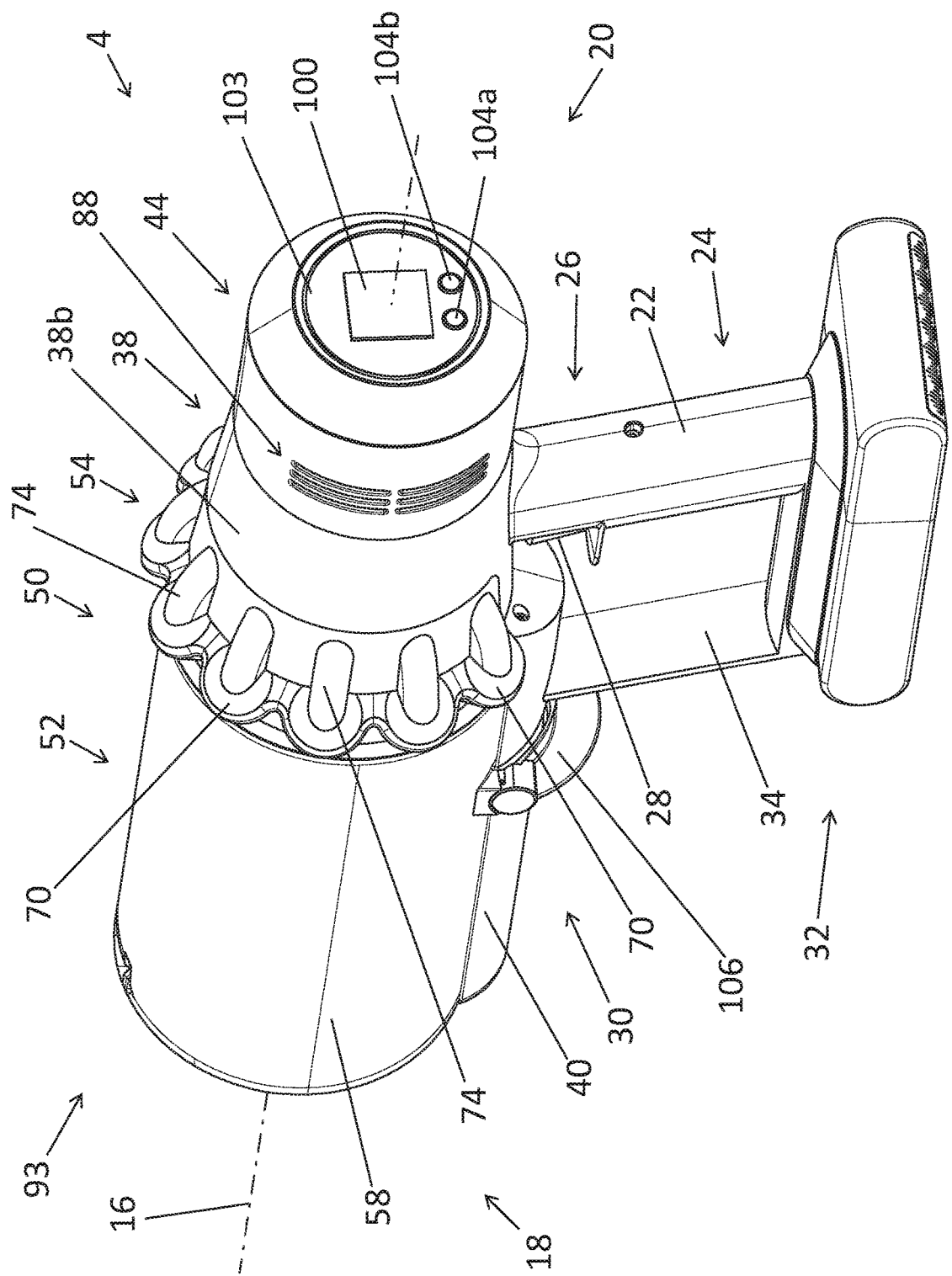
FIG. 2 is a perspective view of a handheld vacuum cleaner of the stick vacuum cleaner of FIG. 1.
Figure 3:
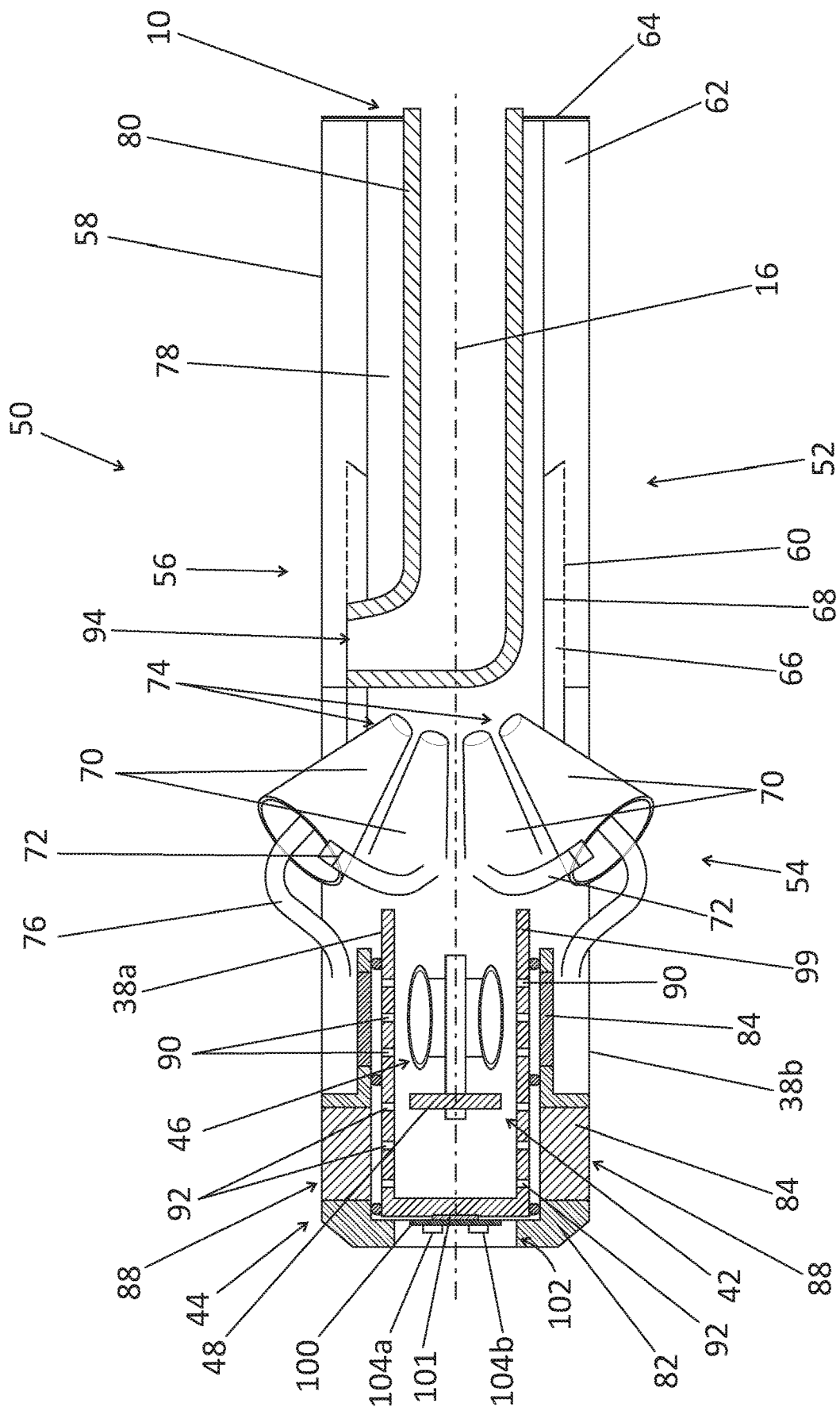
FIG. 3 is a schematic cross-sectional view through the handheld vacuum cleaner of FIG. 2.
Figure 4:
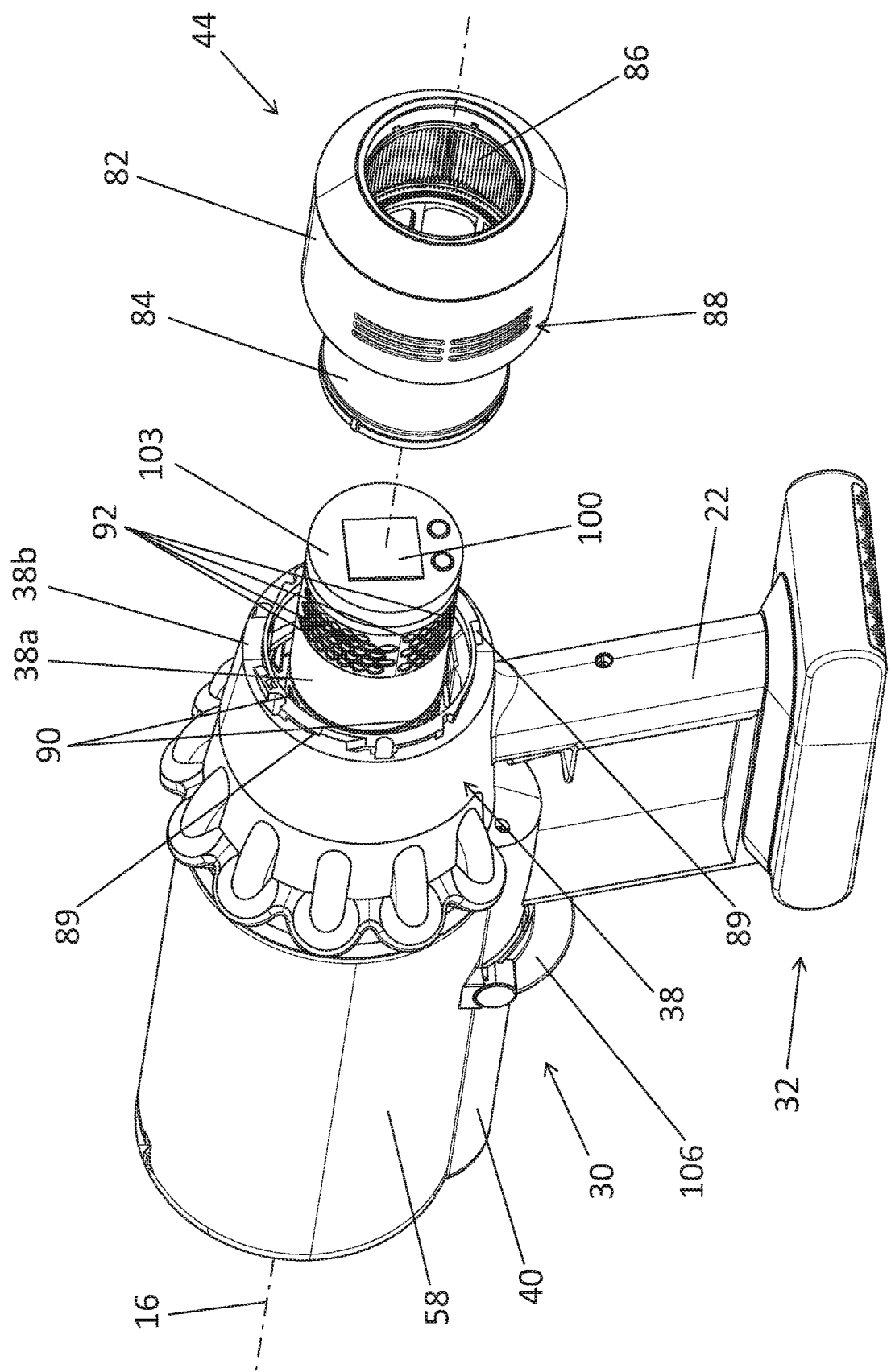
FIG. 4 is a rear perspective view of the handheld vacuum cleaner of FIG. 2, with a filter assembly separated therefrom.

FIGS. 2 to 5 show the handheld vacuum cleaner 4 in isolation. FIGS. 2 and 3 show the handheld vacuum cleaner 4 ready for use, and FIG. 3 shows the handheld vacuum cleaner with a filter assembly 44 detached therefrom. The handheld vacuum cleaner 4 will now be described further with reference to these figures in conjunction with FIG. 1.

As noted above, the pistol grip 22 is positioned transverse to the longitudinal axis 16. In this case, the pistol grip 22 is positioned at an angle of around 75 degrees to the longitudinal axis 16. As shown in FIGS. 1-3, with the handheld vacuum cleaner 4 positioned with the longitudinal axis 16 horizontal, the pistol grip 22 can positioned in a generally vertical orientation, running from a lower end 24 to an upper end 26. The upper end 26 has a trigger 28 which forms the on/off switch for the handheld vacuum cleaner 4.

The handheld vacuum 4 cleaner comprises a first housing 30 positioned at the upper end 26 of the pistol grip 22, and a second housing 32 positioned at the lower end 24 of the pistol grip 22. The first and second housings 30, 32 are attached to one another by the pistol grip 22, and by a support strut 34 which in this case runs generally parallel to the pistol grip 22.

In this embodiment the handheld vacuum cleaner 4 is battery powered. An array of batteries (not visible) are provided in the second housing 32, the batteries and second housing 32 forming a battery pack. In some embodiments the battery pack may be removable, but in this case it is permanently attached. The batteries are rechargeable, and are charged in situ by plugging a charging cable into a charging port (not shown) of the handheld vacuum cleaner 4.

The first housing 30 comprises a motor housing 38 and a separator support 40. The motor housing 38 is generally elongate and defines a longitudinal axis which is collinear with the longitudinal axis 16. The motor housing 38 houses a vacuum motor 42 and supports a filter assembly 44. The vacuum motor 42 comprises an electric motor 46 and an impeller 48. The electric motor 46 is configured to receive power from the batteries (not visible) so as to drive the impeller 48 to rotate about a motor axis which in this case is collinear with the longitudinal axis 16. Rotation of the impeller 48 creates a flow of air through the handheld vacuum cleaner 4 (as discussed in more detail below) and thereby generates suction at the air inlet 10.

The separator support 40 supports a dirt separator 50 which is configured to remove dirt from the air that is drawn into the handheld vacuum cleaner 4 through the air inlet 10. The dirt separator 50 of this embodiment comprises a first separation stage 52 and a second separation stage 54. The first separation stage 52 has a single cyclone chamber 56 formed by an upper portion of a transparent bin 58, a porous cylindrical shroud 60, and a first dirt receptacle 62 which is formed by a lower portion of the bin 58 and an openable lid 64 which is pivotable about a hinge (not visible). The bin 58 takes the form of a cylindrical outer wall which is concentrically positioned around the longitudinal axis 16. With the bin 58 being concentrically positioned, the rotational axis of the first separation stage 52 (i.e. the rotational axis of the cyclone which forms inside the cyclone chamber 56) is collinear with the longitudinal axis.

Behind the shroud 60 is an air passage 66 which surrounds an inner wall 68 and leads to the second separation stage 54. The second separation stage 54 has a plurality of cyclone chambers 70 arranged in parallel. The cyclone chambers 70 have respective tangential inlets 72 which branch off from the air passage 66, open ends 74 configured as dirt outlets, and air outlets in the form of vortex finders 76. The second separation stage 54 also has a second dirt receptacle 78 which is defined between the inner wall 68 and a duct 80 of the air inlet 10. The duct 80 is generally elongate, defining an inlet axis which is parallel to, and in this case collinear with, the longitudinal axis 16.

The filter assembly 44 comprises a casing 82, a pre-motor filter member 84 and a post-motor filter member 86. The casing 82 defines a pair of grid-like air outlets 88 through which clean air (i.e. air from which at least some of the entrained dirt had been separated therefrom) is exhausted from the handheld vacuum cleaner 4. The pre-motor filter member 84 is positioned upstream of the vacuum motor 42 and downstream of the dirt separator 50, and is configured to filter out small dirt particles which were not removed by the dirt separator 50 before they can reach the vacuum motor 42. The pre-motor filter member 84 comprises a layered wad of porous felt which in this case including a layer of an electrostatic felt such as is sold under the name 'Technostat'. The post-motor filter member 86 is positioned downstream of the vacuum motor 42 and upstream of the air outlets 88. The post-motor filter member 86 is configured to filter any dirt particles which may be released by the electric motor 46 (for instance debris from carbon brushes of the electric motor 46). In this case the post-motor filter member 86 is a pleated glass fibre HEPA filter. The filter members 84, 86 are annular in shape and share a common axis, which in this embodiment is collinear with the longitudinal axis 16.

Indeed, the entire filter assembly 44 is annular, and is positioned substantially concentrically around the longitudinal axis 16.

In this embodiment the filter assembly 44 is a user-removable component, allowing the user to remove the filter assembly so as to wash the filter members 84, 86. The dirt separator 50, first housing 30 and filter assembly 44 together form an elongate main body 93 the longitudinal axis of which is collinear with the longitudinal axis 16 of the handheld vacuum cleaner. The filter assembly 44 can be removed from the handheld vacuum cleaner 4 by rotating it slightly about the longitudinal axis 16 so as to disengage it from lugs 89 provided on the motor housing 38, and then moving it rearwards in the direction of the longitudinal axis 16.

When attached to the handheld vacuum cleaner 4 the filter assembly 44 fits around a motor bucket 38a of the motor housing 38 like a sleeve such that it axially overlaps the vacuum motor 44 (both the electric motor 46 and the impeller 48), and projects into an outer cover 38b of the motor housing. The motor bucket 38a has a front array of apertures 90 which provide fluid communication between the pre-motor filter member 84 and the electric motor 46, and a rear array of apertures 92 which provide fluid communication between the electric motor 46 and the post-motor filter member 86.

The handheld vacuum cleaner 4 comprises a screen 100, more particularly a planar, full colour, backlit TFT screen mounted on a rear face of the motor bucket 38a, which faces rearwards. On the reverse of the screen is a controller 101 in the form of a PCB. The controller 101 is configured to receive power from the batteries (not visible) and display information to the user on the screen, as discussed in more detail later.

The screen 100 faces substantially exactly rearwards (i.e. is substantially normal to the longitudinal axis). It is positioned on the first housing 30 (more particularly on the motor bucket 38a, behind the vacuum motor 42), and is therefore situated radially above the pistol grip 22 for ease of visibility. As well as being above it, the screen 100 lies axially behind the pistol grip 22. Indeed, the screen 100 is positioned on a rearmost surface 103 of the handheld vacuum cleaner so that it cannot be obscured by components of the handheld vacuum cleaner positioned behind it. The screen 100 is located such that it is intersected by the longitudinal axis 16.

The screen 100 is visible through an aperture 102 in the filter assembly 44 which takes the form of a circular through-hole in the casing 82 of the filter assembly 44. In this case the screen 100 is recessed slightly with respect to the casing 82 such that the screen is viewed by looking through the aperture 102. In other cases, however, the core 38 of the motor housing 30 may extend slightly further rearwards such that the screen 100 projects through the aperture 102 and stands proud of the casing 82.

Positioned beneath the screen 100 (in the vertical direction defined by the pistol grip 22) are a pair of control members 104a, 104b, each of which is positioned adjacent to the screen 100 and is configured to receive a control input from the user. In this case each control member 104a, 104b takes the form of a push-button. Like the screen 100, each control member 104a, 104b faces rearwards. The control members 104a, 104b are pressed by pushing them forwards in a direction parallel to the longitudinal axis 16. In this embodiment, the buttons 104a, 104b are used to change the suction power level of the vacuum cleaner 4.

To use the stick vacuum cleaner 2, the user grips the handheld vacuum cleaner 4 by the pistol grip 22, with their index finger and middle finger gripping the upper end 26 and their ring finger and little finger gripping the lower end 24. This positions the longitudinal axis 16 substantially in line with the user's forearm when their wrist is straight. The user can then point longitudinal axis 16 of the handheld vacuum cleaner 4 towards an area of floor to be cleaned (by moving their forearm and/or wrist), thereby pointing the air inlet 10, wand 8 and cleaner head 6 towards that area.

When the user squeezes the trigger 28 with their index finger, power from the batteries is delivered to the electric motor 46 by wires (not visible) and the electric motor 46 rotates the impeller 48. The impeller creates a flow of air through the vacuum cleaner, drawing air into the air inlet 10 and exhausting it out of the air outlets 88. This creates suction at the air inlet 10 which draws an air flow into the stick vacuum cleaner 2. The air flow runs through an air flow passage that extends from the suction opening (not visible) of the sole plate 14 to the air outlets 88 of the filter assembly 44, through the cleaner head 6, wand 8 and handheld vacuum cleaner 4.

Dirty air which has entered the air inlet 10 from the cleaner head 6 via the wand 8 passes along the duct 80, an end section 94 of which turns the air flow radially outwards and then directs it to enter the cyclone chamber 56 of the first separation stage 52 tangentially. The air then spirals around the cyclone chamber 56, where coarse dirt is separated therefrom by centrifugal action and is deposited into the first dirt receptacle 62. Air from which coarse dirt has been separated then passes through the shroud 60, through the air passage 66 and into the second separation stage 54. The air then splits into a series of streams, each of which enters one of the cyclone chambers 70 through its inlet 72 and forms a cyclone therein. Finer dirt is separated by centrifugal action and ejected out of the open end 74 of the cyclone chamber 70 into the second dirt receptacle 78, while air from which the finer dirt has been removed exits the cyclone chamber 70 through its vortex finder 76. From the vortex finders 76, the separate streams are then directed into the filter assembly 44. The air is then directed generally radially inwards, through the pre-motor filter member 84, through the apertures 90 and into the electric motor 46. It then passes out axially of the electric motor 46, through the impeller 48, through the apertures 92 and through the post-motor filter member 86. The clean air then runs out of the handheld vacuum cleaner 4 through the air outlets 88.

FIGS. 1 to 4 show the first dirt receptacle 62 in a closed configuration, in which it can receive dirt separated from the airflow by the first separation stage 52. The first dirt receptacle 62 is movable to an open configuration in which dirt contained therein can be emptied (for instance into a bag or dustbin). This is done by manipulating a handle 106 which is positioned beneath the separator support 40 but mounted to the bin 58. The mechanism for moving to the first dirt receptacle 62 between open and closed configurations is generally the same as that used on the Dyson V10 range of vacuum cleaners. This mechanism is not material to the present invention, but will be discussed briefly below for the sake of completeness.

To move the first dirt receptacle 62 from the closed configuration to the open configuration, the user detaches the wand 8, holds the pistol grip 22 of the handheld vacuum cleaner 4 in one hand with the front facing generally downwards, and presses the handle 106 forwards with the other hand. The handle 106 pivots forwards, which disengages a catch (not visible) on the handle 106 which holds it axially stationary relative to the separator support 40. The handle 106 can then slide axially forwards, taking the bin 58 and lid 64 with it. As the lid 64 moves forwards with the bin 58 and handle 106, it breaks contact with the inner wall 68 and allows dirt in the second dirt receptacle 78 to fall into the first dirt receptacle 62.

Figure 5:
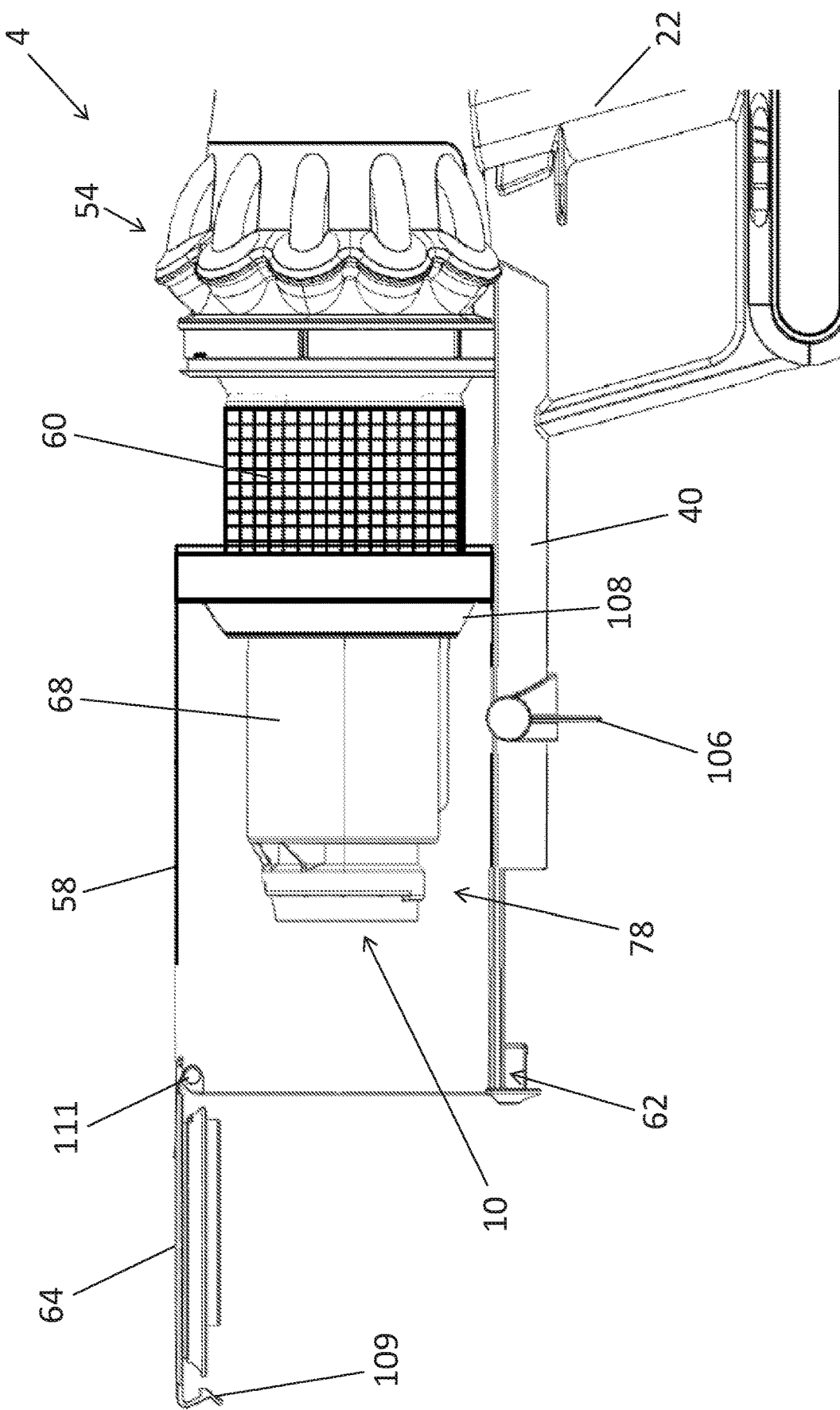
FIG. 5 is a side view of the handheld vacuum cleaner of FIGS. 2 to 4, with a dirt receptacle in an open configuration.

As the bin slides forwards, an annular wipe 108 mounted to its rear end slides across the shroud 60 so as to scrape off any dirt that has adhered to the shroud 60. When the handle 106, bin 58 and lid 64 have travelled sufficiently far forward, a cam-driven push-rod (not visible) forces open a bin lid catch 109 holding the lid 64 against the bin 58. The lid 64 can then pivot away from the bin around the hinge 111, under gravity and under action of a torsion spring (not visible) inside the hinge 111. The first dirt receptacle 62 is then in the open configuration, as shown in FIG. 5. Dirt can then fall out of the bin 58.

The user then begins to move the first dirt receptacle 62 back to the closed configuration by pushing the lid 64 rearwards. The lid 64 pivots back around the hinge 111 and the catch 109 rests against the bin 58, then the lid 64, bin 58 and handle 106 move rearwards. Part way through this rearward travel the cam-driven push rod (not visible) retracts. When the bin 58, lid 64 and handle 64 reach the end of their rearward travel, the bin lid catch 109 and the catch holding the handle 106 relative to the separator support 40 re-engage with the separator support 40 and bin 58 respectively.

As discussed above, the controller 101 displays information to the user on the screen 100. More particularly, it displays video instructions for normal operation of the vacuum cleaner 2 and video instructions for problem-solving when the vacuum cleaner 2 has a fault.

One of the sets of video instructions that the controller 101 can display on the screen 100, more particularly one of the sets of video instructions for normal operation, is video instructions for cleaning the filter assembly 44. The controller 101 detects when the vacuum is in a state where the filter is clogged (in this case by monitoring for a steady drop in air flow rate using a sensor array, as is known). When it detects that the filter is clogged, it automatically displays a video on the screen 100 showing the user how to remove the filter assembly 44, wash it and replace it. However, if the user wishes to continue using the vacuum cleaner (for instance to finish the particular surface they are vacuuming) then they can do so. The controller 101 will continue to display the video instructions on repeat until it detects (again by monitoring flow rate) that the filter has been cleaned.

Figure 6A:
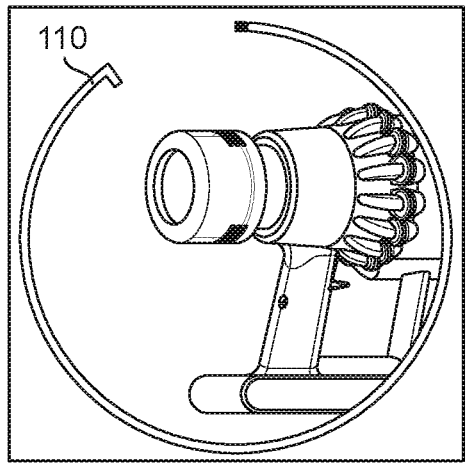
FIGS. 6A to 6H are stills of a set of video instructions on how to detach, clean and reattach the filter assembly of the vacuum cleaner.
Figure 6B:
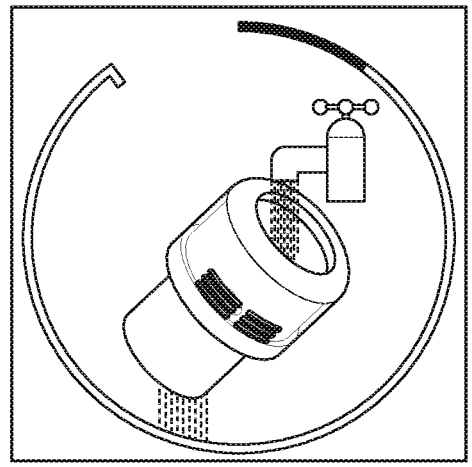

In this case the video instructions for filter washing comprise a single continuous video, stills from which are shown in FIGS. 6A to 6H. Referring to these figures in combination with FIGS. 1-4, the first part of this set of video instructions shows the user how to detach the filter assembly 44 by rotating it and then moving it axially backwards. This is illustrated in FIG. 6A. The video then show the inside of the post-motor filter member 86 being run under a tap, demonstrating to the user that they should do the same. This is shown in FIG. 6B.

Figure 6C:
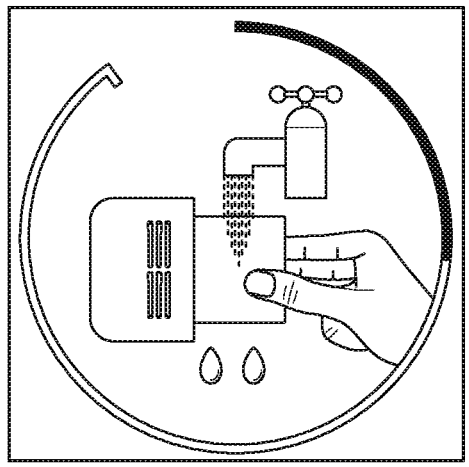
Figure 6D:
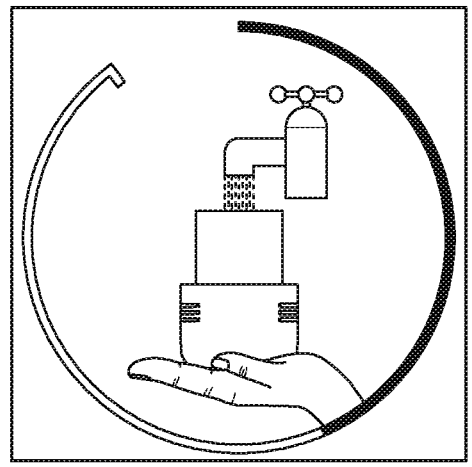
Figure 6E:
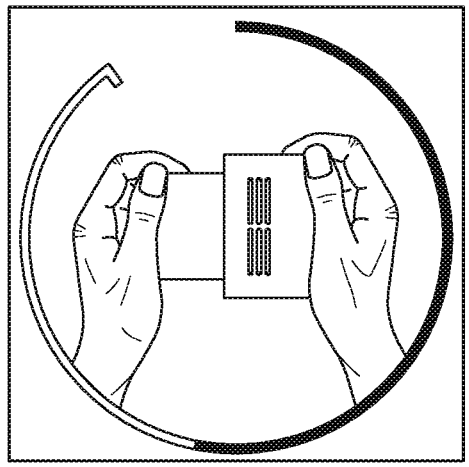
Figure 6F:
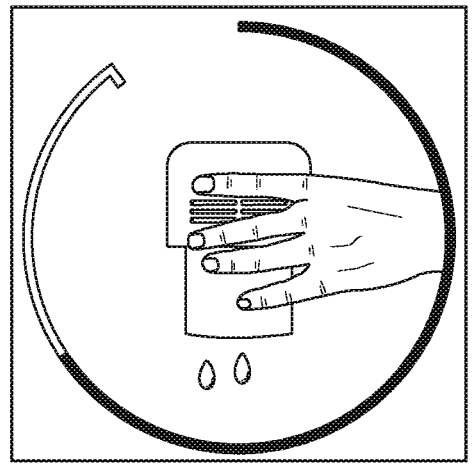
Figure 6G:
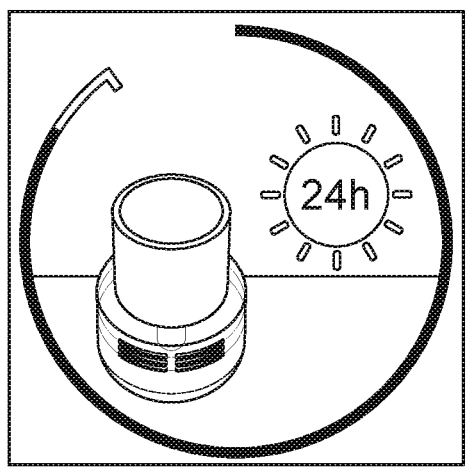
Figure 6H:
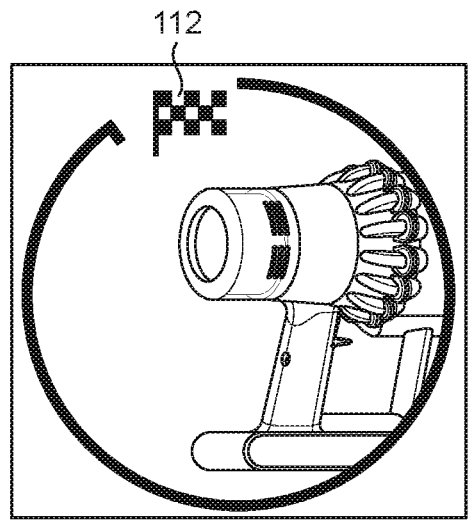

The video then shows the outside of the pre-motor filter member 84 being run under a tap, as shown in FIG. 6C. It then shows the filter assembly 44 being rested on the user's hand and filled up with water (FIG. 6D), shaken (FIG. 6E) and then emptied out (FIG. 6F). The video then shows the filter assembly 44 being left to dry (FIG. 6G). Finally, it shows the filter assembly 44 being re-attached to the vacuum cleaner by sliding it on to the motor bucket 38a and rotated to lock it in place (FIG. 6H).

It is noteworthy that the video instructions described above show the user how to remove and replace the filter assembly 44. It is therefore an example of video instructions for disassembling the handheld vacuum cleaner 4, and for assembling the handheld vacuum cleaner, as well as video instructions for cleaning the filter assembly 44.

It is noteworthy that the above video also includes a visual timer in the form of an arcuate progress bar 110, allowing the user to see how much longer the video has to run. The video also displays an indication that playback is complete. More particularly, when the progress bar 110 reaches the end a small chequered flag 112 is displayed next to it. This confirms to the user that the procedure shown in the video is complete.

The controller 101 is configured to display several other types of video instructions. For example, the controller 101 can also show a video demonstrating the user how to move the first dirt receptacle 62 to the closed configuration (which is another example of video instructions for normal operation). The controller 101 displays that video on the screen 100 if the controller detects that the handheld vacuum cleaner 4 is in a state where the first receptacle 62 is out of the closed configuration and the trigger 28 is pulled. This may suggest that the user has attempted to place the first dirt receptacle 62 in the closed position but has not managed properly, and is now attempting to use the vacuum cleaner 4.

If the controller 101 detects that the vacuum cleaner 4 is in this state, as well as displaying the video instructions showing how to place the first dirt receptacle 62 in the closed configuration the controller 101 also cuts power to the vacuum motor 42. This prevents the user from operating the vacuum cleaner 4 with the bin 58 partially open, which would prevent proper function of the vacuum cleaner and could cause residual dust in the bin to be ejected into the atmosphere. With the vacuum cleaner 4 not functioning, the user will look to the screen 100 for an explanation and will therefore see the video instructions for closing the bin.

Figure 7A:
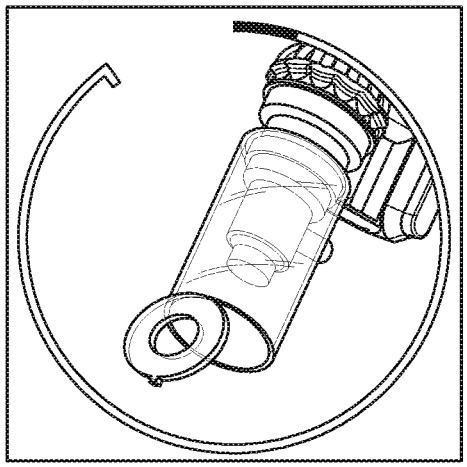
FIGS. 7A to 7G are stills of a set of video instructions on how to move the dirt receptacle of the handheld vacuum cleaner to a closed configuration.
Figure 7B:
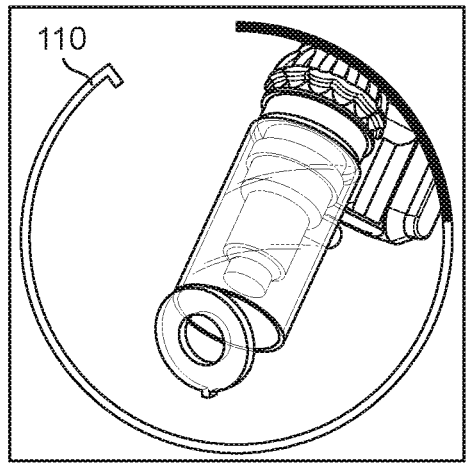
Figure 7C:
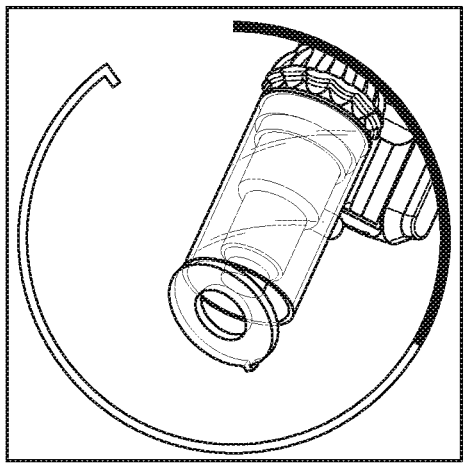
Figure 7D:
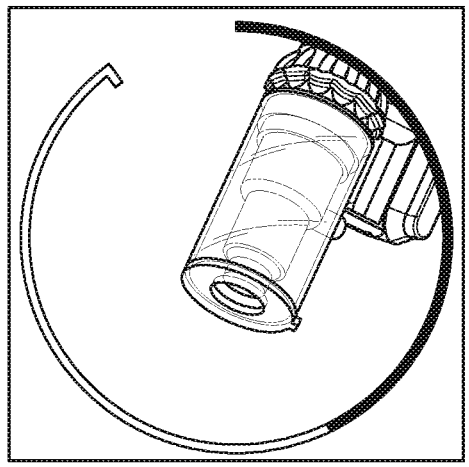
Figure 7E:
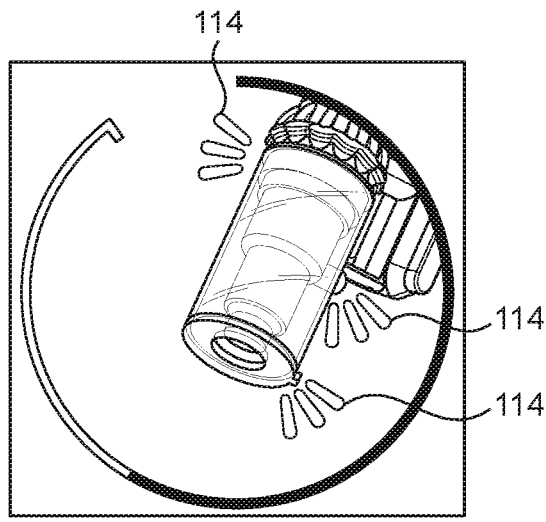
Figure 7F:
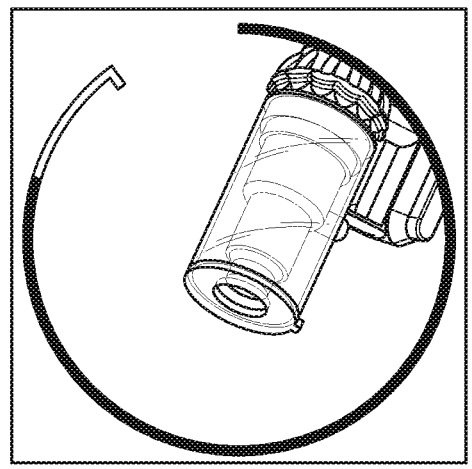

The video instructions for moving the dirt receptacle 62 to the closed configuration again take the form of a single continuous video, stills from which are shown in FIGS. 7A to 7G. Like the video illustrated in FIGS. 6A to 6H, this video has a progress bar 110 showing the user how far through the video they are at any particular point. The video first shows the dirt receptacle 62 in the open configuration (FIG. 7A), then shows the lid 64 being pivoted back onto the end of the bin 58 (FIG. 7B). After the lid 64 is back against the bin 58 (FIG. 7C) the video shows the bin 58, lid 64 and handle 106 moving rearwards (FIG. 7D). Once these components have reached the end of their rearward travel the video shows the handle 106 moving back into register with the separator support 40, the lid 64 being closed onto the end of the bin 58 and the catch (not visible) re-engaging, and the rear edge of the bin 58 seating back against the second separation stage 54 (FIG. 7E). Red markers 114 emanating from these parts of the machine illustrate to the user that they should hear these components 'click' back into place.

Figure 7G:
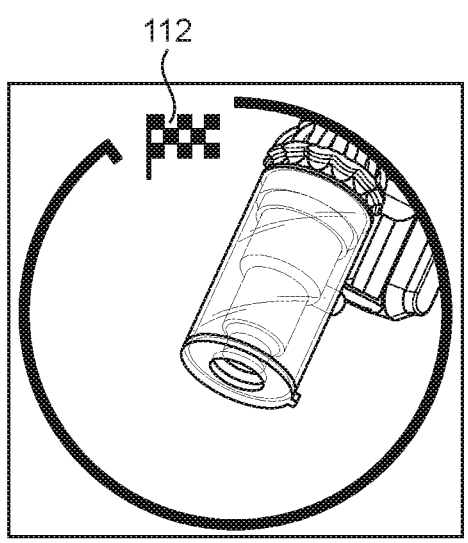

At this point, the video has completed its animation of the procedure to be performed by the user. The video finishes by showing the handheld vacuum cleaner 4 with the dirt receptacle 68 in the closed configuration (FIG. 7F), then displays the chequered flag 112 to indicate that the video instructions have finished (FIG. 7G).

As well as displaying video instructions for normal operation of the stick vacuum cleaner 2 (or the handheld vacuum cleaner 4), the controller 101 can also display on the screen 100 video instructions for problem solving. More particularly, it can display video instructions for locating a blockage in the air flow path of the stick vacuum cleaner 2.

Unlike the video instructions described above, this set of video instructions takes the form of a set of sub-videos which are displayed in sequence. In this case the controller 101 displays each sub-video twice, then initiates a pause in video playback (of 5 seconds in this example), then advances to the next sub-video. Stills from each of the sub-videos are shown in FIGS. 8A to 8G.

Figure 8A:
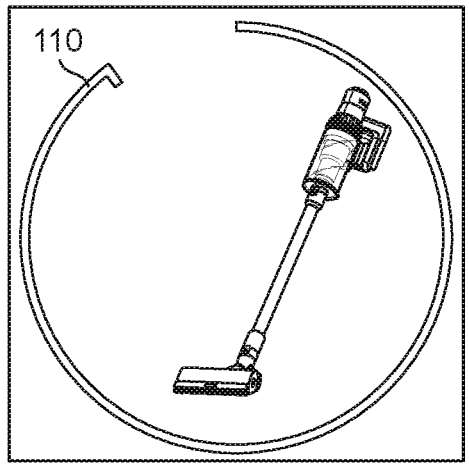
FIGS. 8A to 8G are sets of stills of sub-videos which make up video instructions for locating a blockage in an air flow path of the stick vacuum cleaner.
Figure 8A:
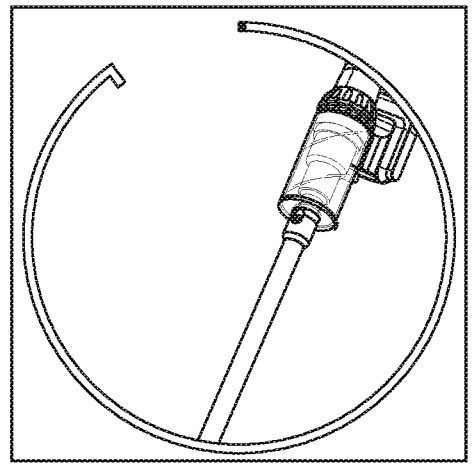
Figure 8A:
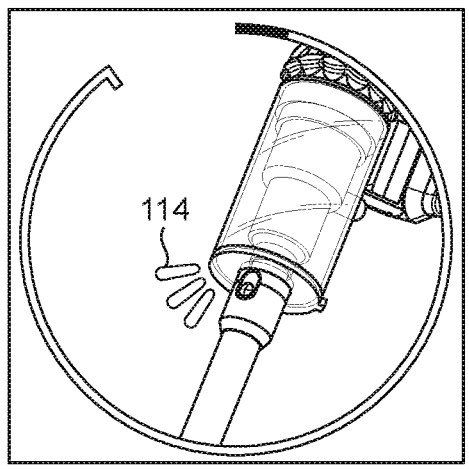
Figure 8A:
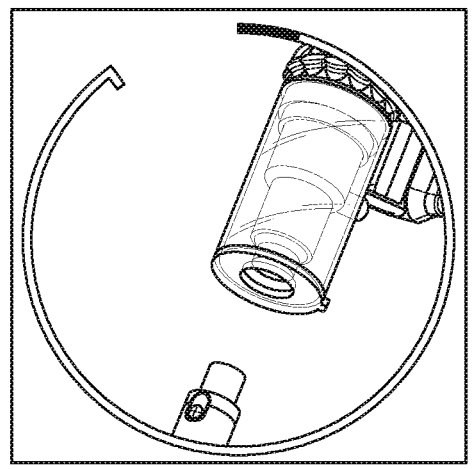
Figure 8B:
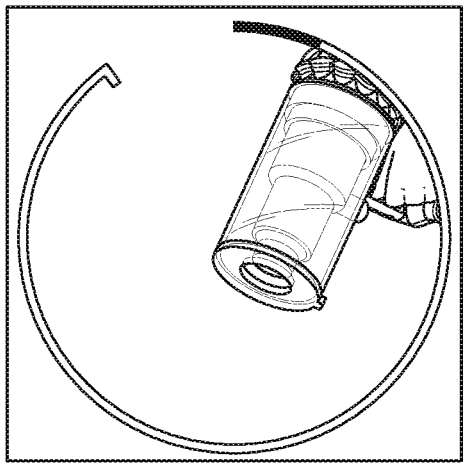
Figure 8B:
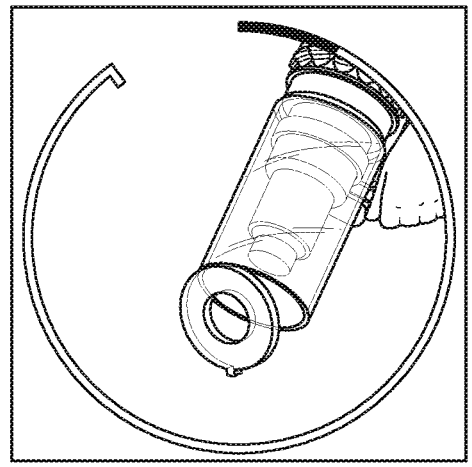
Figure 8B:
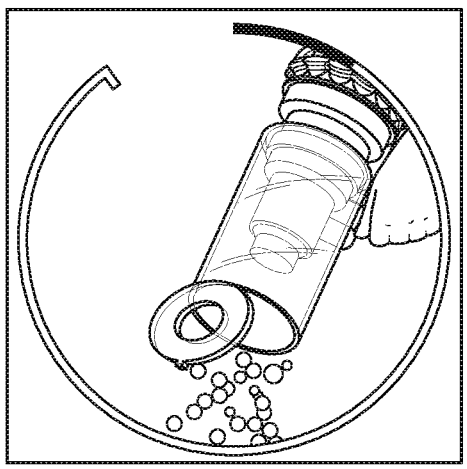
Figure 8B:
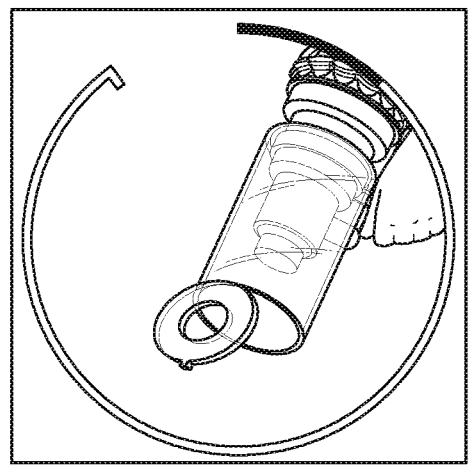
Figure 8C:
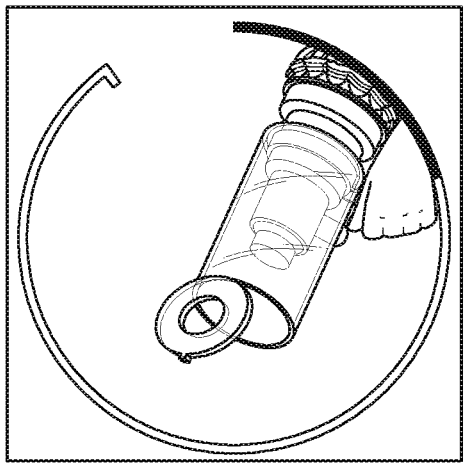
Figure 8C:
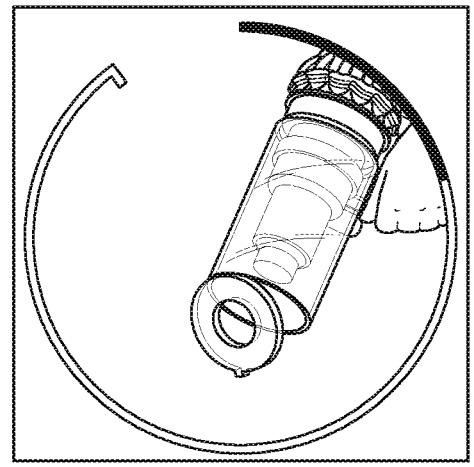
Figure 8C:
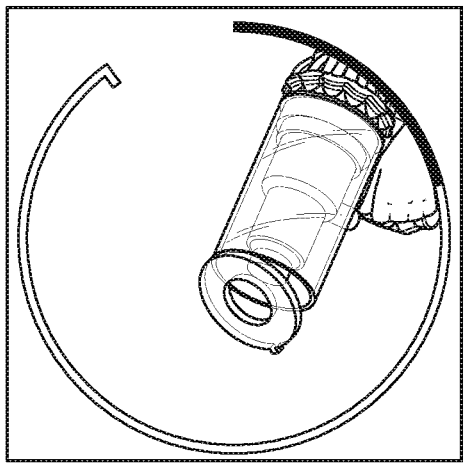
Figure 8C:
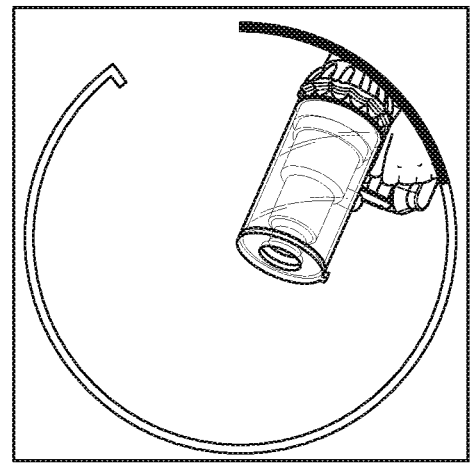
Figure 8D:
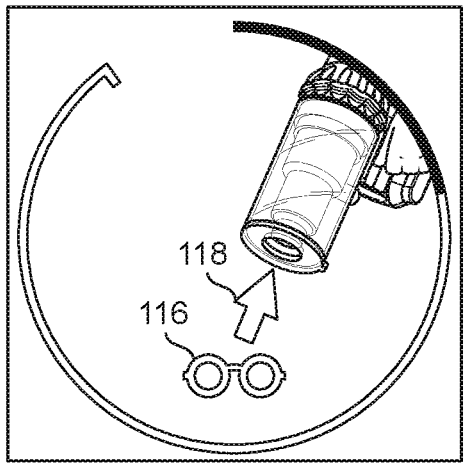
Figure 8D:
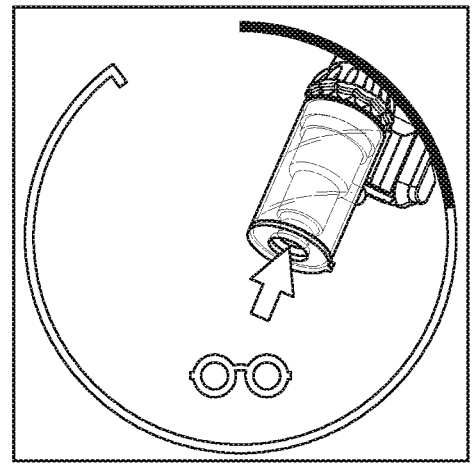
Figure 8D:
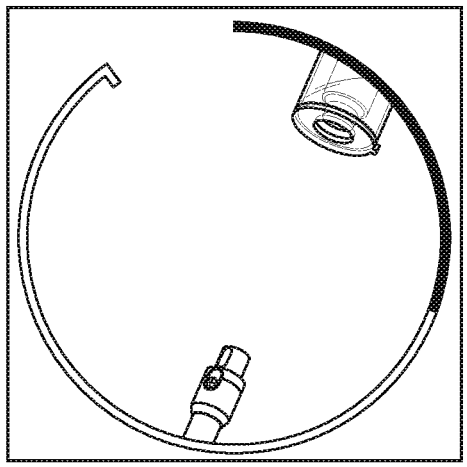
Figure 8D:
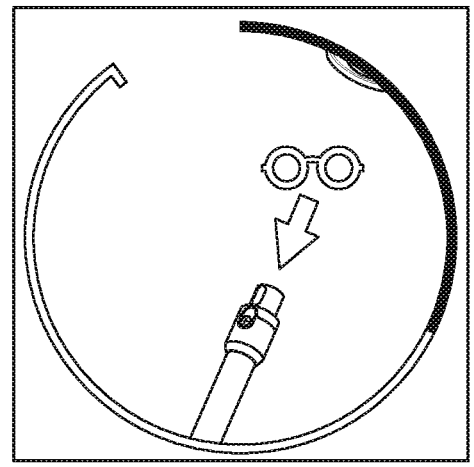
Figure 8E:
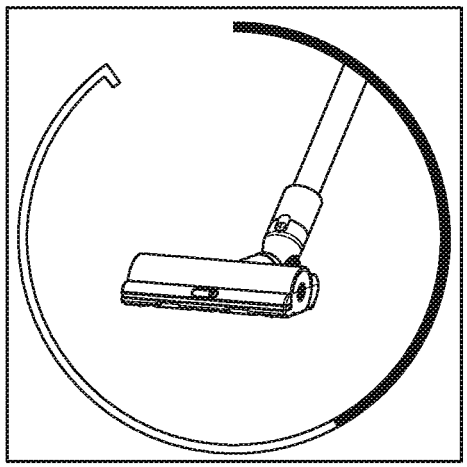
Figure 8E:
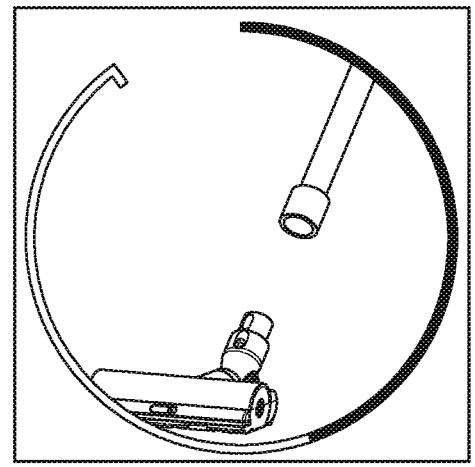
Figure 8E:
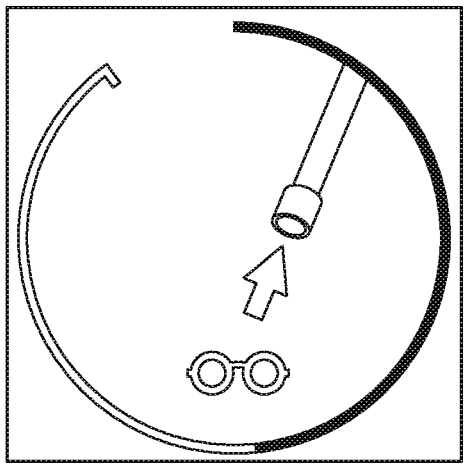
Figure 8E:
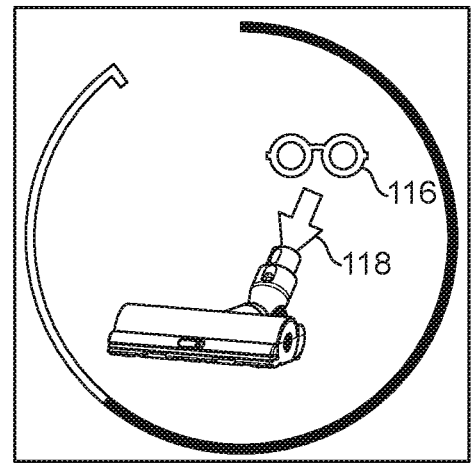
Figure 8F:
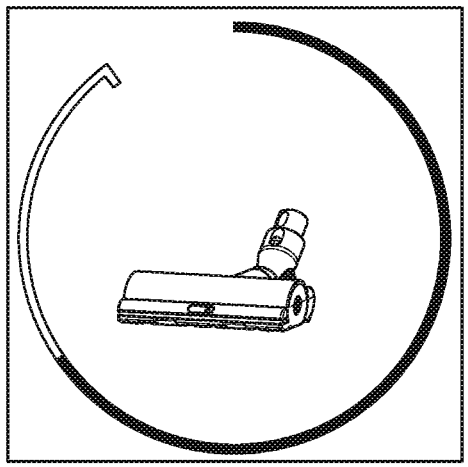
Figure 8F:
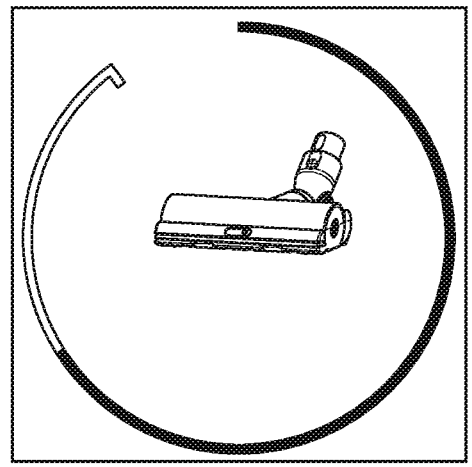
Figure 8F:
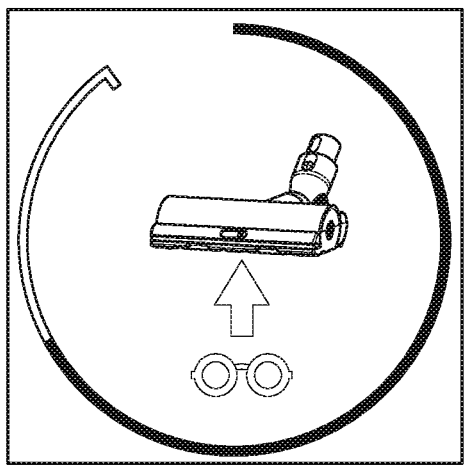
Figure 8F:
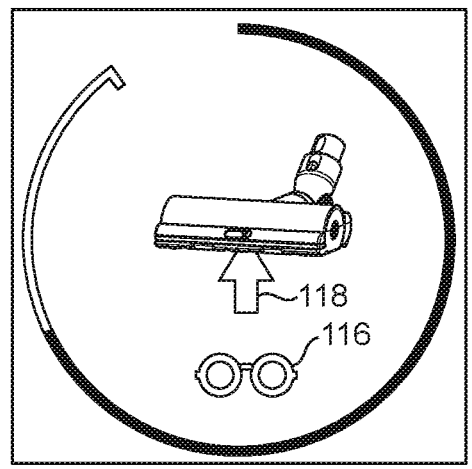
Figure 8G:
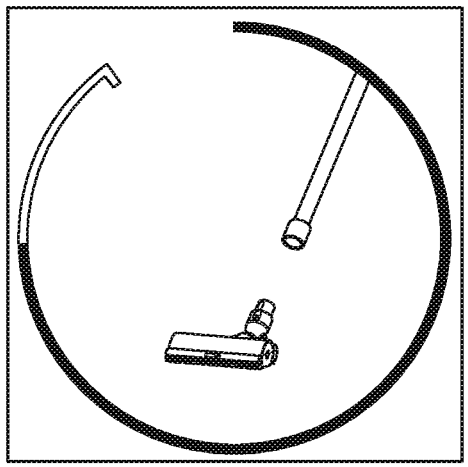
Figure 8G:
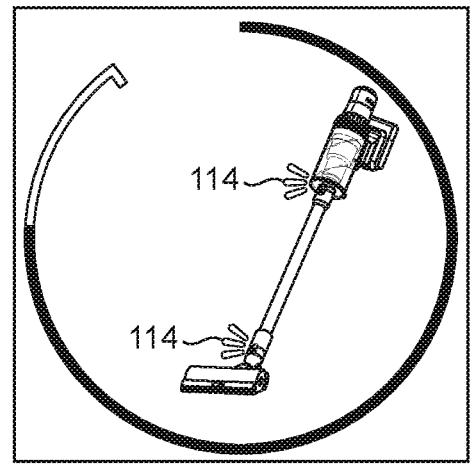
Figure 8G:
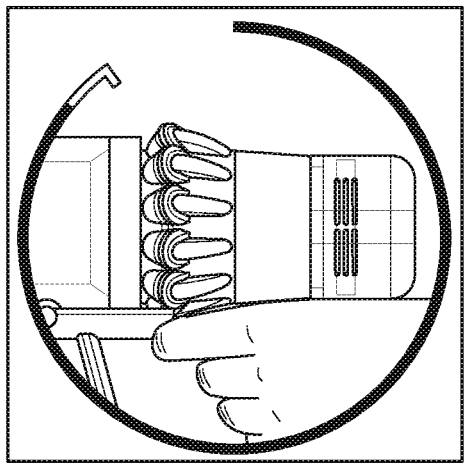
Figure 8G:
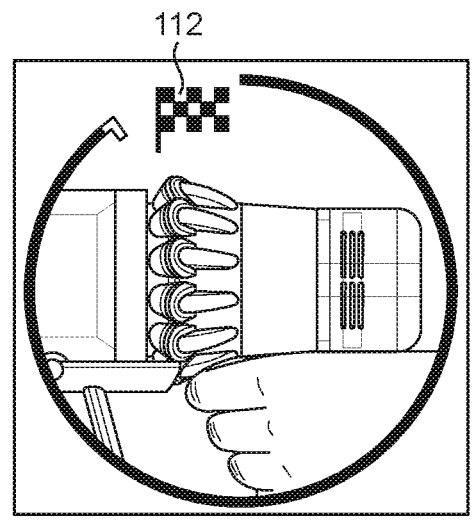

In the first sub-video, shown in FIG. 8A, the video 'zooms in' on the intersection between the wand 8 and the air inlet 10, and shows the wand 8 being detached from the air inlet 8. In the second sub-video, shown in FIG. 8B, the video shows the first and second dirt receptacles 62, 78 being moved to the open configuration. The sub-video shows the handle 106 being pivoted, the handle 106, bin 58 and lid 64 sliding open, and the lid opening to allow dirt to escape from the bin. The third sub-video (FIG. 8C) shows the lid 64 being closed and the bin 58 slid backwards so as to return the dirt receptacles 62, 78 to their respective closed configurations.

The fourth sub-video (FIG. 8D) demonstrates to the user that they should look up into the air inlet 10 of the handheld vacuum cleaner 4 and then look down into the wand 8. In this case the user is shown to look in these directions by a pair of glasses 116 and an animated arrow 118. The fifth sub-video (FIG. 8E) shows the cleaner head 6 being detached from the wand 8, then demonstrates to the user (again using the glasses 116 and arrow 118) that they should down into the rear duct 12 of the cleaner head then up into the wand 8. In the sixth sub-video (FIG. 8F), the glasses 116 and arrow 118 indicate that the user should look up into the cleaner head 6 through the suction opening in the sole plate 14.

The seventh and final sub-video (FIG. 8G) shows the stick vacuum cleaner 2 being re-assembled. The cleaner head 6 is shown being re-attached to the wand 8 and the wand re-attached to the handheld vacuum cleaner 4. The sub-video then shows the trigger 28 being pulled so as to show the user that (presuming they have removed any blockages they encountered while performing the above procedure) the vacuum cleaner 2 is ready for use. To re-inforce this, the sub-video again shows the chequered flag 112.

The presence of a blockage in the air path of a vacuum cleaner can cause the vacuum motor to overheat and/or can cause cleaning performance to drop dramatically. Accordingly, when the controller 101 detects that the vacuum cleaner is blocked (in this case by observing a sudden drop in air flow rate, as is known) the controller cuts power to the vacuum motor 42. This protects the vacuum motor 42 from damage and avoids the risk of the user continuing to attempt to clean using the vacuum cleaner 2. It also serves as a notification to the user that has a fault has occurred, at which point they will look to the screen 100 for further information.

It is noteworthy that since this set of video instructions shows the user how to separate the handheld vacuum cleaner 4, cleaner head 6 and wand 8, it is an example of video instructions for disassembling and assembling the stick vacuum cleaner 2. Furthermore, as noted above the second sub-video shows the user how to empty the dirt receptacles 62, 78. This sub-video (and thus the entire video) is therefore also an example of video instructions for moving a dirt receptacle to the open configuration (which is also an example of video instructions for normal use).

It will be appreciated that numerous modifications to the above described embodiments may be made without departing from the scope of invention as defined in the appended claims. For instance, although in the above embodiment the dirt receptacles 62, 78 are moved to the open configuration by sliding the bin 58 forwards and opening the lid 64, in another embodiment there may be a single dirt receptacle which may take the form of a closed-bottomed cup which is emptied by removing it from the vacuum cleaner and upending it over a dustbin.

As another example, although in the embodiment described above the buttons 104a, 104b are used to control the power mode of the handheld vacuum cleaner 4, they may perform other functions instead or as well. For instance, one or both of the buttons 104a, 104b may be used to manually cycle through sub-videos rather than the controller progressing through them automatically. Instead or as well, one of the buttons may allow the user to pause and un-pause and/or rewind video instructions at will.

For the avoidance of doubt, in the embodiment above the video instructions for moving a dust receptacle between open and closed configurations has been described in relation to the first dirt receptacle 62. However, it should be understood that these video instructions also show the user how to move the second dirt receptacle 78 between open and closed configurations.

Whilst the above video instructions show each stage of the procedure in question, this should not be construed as limiting. A set of video instructions may show only a part of the procedure in question (for instance the part deemed the most counter-intuitive).

For the avoidance of doubt, the optional and/or preferred features described above may be utilised in any suitable combinations, and in particular in the combinations set out in the appended claims. Features described in relation to one aspect of the invention, may also be applied to another aspect of the invention, where appropriate.

The invention claimed is:

1. A vacuum cleaner comprising:
    a vacuum motor configured to draw an air flow through an air flow path of the vacuum cleaner;
    a dirt separator for separating dirt entrained in the air flow, the dirt separator having a dirt receptacle, wherein the dirt receptacle has a closed configuration in which the dirt receptacle can receive dirt separated from the air flow, and an open configuration in which dirt contained in the dirt receptacle can be emptied therefrom;
    a display screen; and
    a controller configured to automatically display video instructions on the display screen upon detecting that the vacuum cleaner is in an associated condition,
    wherein the video instructions comprise a sequence of sub-videos, each sub-video of the sequence of sub-videos portraying a task,
    wherein the controller is configured to automatically advance from one sub-video to a next sub-video of the sequence of sub-videos, and
    wherein the controller is configured to automatically perform one or more of:
        repeating the one sub-video before automatically advancing to the next sub-video, or
        instigating a pause between the one sub-video and the next sub-video.

2. The vacuum cleaner of claim 1, wherein the video instructions include video instructions for normal operation of the vacuum cleaner.

3. The vacuum cleaner of claim 2, wherein the video instructions for normal operation include instructions for moving the dirt receptacle from the closed configuration to the open configuration.

4. The vacuum cleaner of claim 2, wherein the video instructions for normal operation include instructions for moving the dirt receptacle from the open configuration to the closed configuration.

5. The vacuum cleaner of claim 2, wherein the video instructions for normal operation include instructions for cleaning a filter assembly of the vacuum cleaner.

6. The vacuum cleaner of claim 1, wherein the video instructions include video instructions for problem-solving.

7. The vacuum cleaner of claim 6, wherein the video instructions for problem-solving include video instructions for locating a blockage in the air flow path.

8. The vacuum cleaner of claim 1, wherein the video instructions include video instructions for assembling and disassembling the vacuum cleaner.

9. The vacuum cleaner of claim 1, wherein the controller is configured to selectively cut power to the vacuum cleaner upon detecting that the vacuum cleaner is in the associated condition.

10. The vacuum cleaner of claim 1, wherein the vacuum cleaner is a handheld vacuum cleaner which further comprises a pistol grip which is positioned transverse to a longitudinal axis of the vacuum cleaner that runs from a front end to a rear end thereof, and an air inlet positioned forward of the pistol grip.

11. A stick vacuum cleaner comprising:
   a handheld vacuum cleaner according to claim 10;
   a cleaner head defining a suction opening; and
   an elongate rigid wand defining a suction path which extends from the cleaner head to the air inlet of the handheld vacuum cleaner, the wand being positioned parallel to or collinear with the longitudinal axis.

12. The vacuum cleaner of claim 1, wherein the video instructions include video instructions for assembling or disassembling the vacuum cleaner.

13. The vacuum cleaner of claim 1, wherein the controller is configured to automatically advance from one sub-video to a next sub-video of the sequence of sub-videos after a predetermined number of repeats of the sub-video of the sequence of sub-videos.

14. The vacuum cleaner of claim 1, wherein the controller is configured to automatically advance from one sub-video to a next sub-video of the sequence of sub-videos after a predetermined period of time.

\* \* \* \* \*